US010896121B2

(12) United States Patent
Edri

(10) Patent No.: US 10,896,121 B2
(45) Date of Patent: Jan. 19, 2021

(54) METHODS AND SYSTEMS FOR SOFTWARE RELATED PROBLEM SOLUTION

(71) Applicant: Picangelo Ltd., Tel-Aviv (IL)

(72) Inventor: Abraham Edri, Tel-Aviv (IL)

(73) Assignee: Picangelo Ltd., Tel-Aviv (IL)

( * ) Notice: Subject to any disclaimer, the term of this patent is extended or adjusted under 35 U.S.C. 154(b) by 25 days.

(21) Appl. No.: 16/075,690

(22) PCT Filed: Feb. 6, 2017

(86) PCT No.: PCT/IL2017/050145
§ 371 (c)(1),
(2) Date: Aug. 6, 2018

(87) PCT Pub. No.: WO2017/134677
PCT Pub. Date: Aug. 10, 2017

(65) Prior Publication Data
US 2019/0050320 A1    Feb. 14, 2019

Related U.S. Application Data

(60) Provisional application No. 62/429,947, filed on Dec. 5, 2016, provisional application No. 62/292,261, filed on Feb. 6, 2016.

(51) Int. Cl.
*G06F 11/36* (2006.01)
(52) U.S. Cl.
CPC ......... *G06F 11/3664* (2013.01); *G06F 11/36* (2013.01)
(58) Field of Classification Search
CPC .......................... G06F 11/3664; G06F 11/36

USPC ........................................................ 717/125
See application file for complete search history.

(56) References Cited

U.S. PATENT DOCUMENTS

| 6,345,322 | B1 | 2/2002 | Humphrey |
| 7,802,236 | B2* | 9/2010 | Calder ............... G06F 11/3452 717/130 |
| 8,516,309 | B1 | 8/2013 | Kulkarni et al. |
| 9,075,718 | B2 | 7/2015 | Hinterbichler et al. |

(Continued)

FOREIGN PATENT DOCUMENTS

WO    WO 2017/134677    8/2017

OTHER PUBLICATIONS

International Preliminary Report on Patentability dated Aug. 16, 2018 From the International Bureau of WIPO Re. Application No. PCT/IL2017/050145. (6 Pages).

(Continued)

*Primary Examiner* — Lewis A Bullock, Jr.
*Assistant Examiner* — Theodore E Hebert

(57) ABSTRACT

A method of automatically cross-referencing problem information between users, comprising: monitoring, via a network, problems in one of a plurality of software programs, each executed on one of a plurality of client terminals; storing in a problems dataset a plurality of problem entries, each containing problem information of at least one of the problems; detecting a new problem occurring in a first client terminal of the plurality of client terminals; analyzing the new problem to identify at least one similar problem in the problems dataset based on the problem information; and presenting an indication of the at least one similar problem to assist in eliminating said new problem.

16 Claims, 7 Drawing Sheets

(56) References Cited

U.S. PATENT DOCUMENTS

| | | | | |
|---|---|---|---|---|
| 2004/0003335 A1* | 1/2004 | Gertz | .................... | H03M 13/47 |
| | | | | 714/758 |
| 2007/0079231 A1* | 4/2007 | Ahyh | ........................ | G06F 8/36 |
| | | | | 715/204 |
| 2008/0127095 A1* | 5/2008 | Brennan | ............. | G06F 11/3664 |
| | | | | 717/124 |
| 2010/0287109 A1* | 11/2010 | Li | ........................ | G06F 11/3664 |
| | | | | 705/319 |
| 2013/0007700 A1* | 1/2013 | Villar | ........................ | G06F 8/33 |
| | | | | 717/109 |
| 2013/0152047 A1* | 6/2013 | Moorthi | .............. | G06F 11/3688 |
| | | | | 717/124 |
| 2013/0282739 A1* | 10/2013 | Anderson | ............ | G06F 17/2705 |
| | | | | 707/755 |
| 2014/0282031 A1 | 9/2014 | Hinterbichler et al. | | |
| 2015/0269060 A1* | 9/2015 | Rodmell | ............. | G06F 11/3664 |
| | | | | 717/124 |
| 2016/0117239 A1* | 4/2016 | Hamilton, II | ........ | G06F 11/3684 |
| | | | | 717/124 |
| 2017/0116109 A1* | 4/2017 | Perez Acosta | ............ | G06F 8/42 |
| 2019/0050320 A1* | 2/2019 | Edri | ........................ | G06F 11/36 |

OTHER PUBLICATIONS

International Search Report and the Written Opinion dated May 18, 2017 From the International Searching Authority Re. Application No. PCT/IL2017/050145. (9 Pages).

Breckel "Error Mining: Bug Detection Through Comparison With Large Code Databases", Proceedings of the 9th IEEE Working Conference on Mining Software Repositories, MSR'12, Zurich, Switzerland, Jun. 2-3, 2012, p. 175-178, Jun. 2, 2012. Abstract.

Invitation Pursuant to Rule 62a(1) EPC and Rule 63(1) EPC Dated Aug. 8, 2019 From the European Patent Office Re. Application No. 17747124.0. (4 Pages).

Supplementary Partial European Search Report and the European Search Opinion dated Jan. 9, 2020 From the European Patent Office Re. Application No. 17747124.0. (12 Pages).

* cited by examiner 301 302 303

METHODS AND SYSTEMS FOR SOFTWARE RELATED PROBLEM SOLUTION

RELATED APPLICATIONS

This application is a National Phase of PCT Patent Application No. PCT/IL2017/050145 having International filing date of Feb. 6, 2017, which claims the benefit of priority under 35 USC § 119(e) of U.S. Provisional Patent Application Nos. 62/292,261 filed on Feb. 6, 2016 and 62/429,947 filed on Dec. 5, 2016. The contents of the above applications are all incorporated by reference as if fully set forth herein in their entirety.

FIELD AND BACKGROUND OF THE INVENTION

The present invention, in some embodiments thereof, relates to tools for solving software related problems and, more particularly, but not exclusively, to cross-referencing problem information between code developers.

Software developers constantly face code problems in their developed code. To overcome these problems, developers use build-in and/or added tools in the integrated development environments (IDEs) such as Eclipse, Microsoft visual studio or JetBrains' IntelliJ, that are used for development. Developers facing code and/or compilation problems may also be assisted by other developers, such as colleagues in their organization and/or over the internet, for example in forums and/or blogs, such as StackOverflow.

SUMMARY OF THE INVENTION

According to an aspect of some embodiments of the present invention there is provided a method of automatically cross-referencing problem information between users, comprising: monitoring, via a network, problems in one of a plurality of software programs, each executed on one of a plurality of client terminals; storing in a problems dataset a plurality of problem entries, each containing problem information of at least one of the problems; detecting a new problem occurring in a first client terminal of the plurality of client terminals; analyzing the new problem to identify at least one similar problem in the problems dataset based on the problem information; and presenting an indication of the at least one similar problem to assist in eliminating the new problem.

Optionally, the users are code developers and the problems are occurring during code developed in a plurality of integrated development environments (IDEs), each executed on one of the plurality of client terminals.

More optionally, the monitoring is done via program executed on the client terminals and integrated in the IDEs.

More optionally, the problem information includes at least one of text from the IDEs relating to each of the problems, a code section relating to each of the problems, time when each of the problems occurred, details of a user working on the IDE relating to each of the problems, notes entered by a user working on the IDE relating to each of the problems and solution status of each of the problems.

Optionally, the detecting a new problem is done in response to receiving a command from the user of the first client terminal.

Optionally, the detecting includes presenting an indication of the detected problem to the user of the first client terminal.

Optionally, the analyzing includes determining a degree of similarity is for each of the at least one similar problem to the new problem.

Optionally, the indication is presented in the graphical user interface (GUI) of the first client terminal.

More optionally, the indication includes marking the new problem in the GUI according to a solution status of the at least one similar problem.

Optionally, the indication includes a list of entries, each relating to one of the at least one similar problem.

More optionally, the list is sorted according to at least one of a degree of similarity of each of the at least one similar problem to the new problem, solution status of each of the at least one similar problem, relationship of the user to other users respectively relating to each of the at least one similar problem.

More optionally, entries for only some of the at least one similar problem is presented in the list based on a predetermined criterion.

Optionally, the method further comprises: receiving a command from the user to select one of the at least one similar problem; and presenting to the user at least one of the problem information stored in the problems dataset for the selected similar problem and data of the analysis.

Optionally, the method further comprises: providing a communication platform for the user to interact with a second user, the second user relates to the selected similar problem.

More optionally, data from the first client terminal is transferred to the second user via the communication platform.

More optionally, the method further comprises: presenting to the second user at least one of the problem information stored in the problems dataset for the selected similar problem, the problem information stored in the problems dataset for the new problem and data of the analysis.

More optionally, the method further comprises: presenting to the user changes made in code relating to the selected similar problem during the process of solving the selected similar problem.

Optionally, the method further comprises: detecting a new solution to the new problem; and sending a message to be presented in client terminals relating to the at least one similar problem, indicating a possible solution is found.

Optionally, the method further comprises: receiving a command from the user to publish a request for help in eliminating the new problem; and sending a message to be presented in client terminals relating to the at least one similar problem, indicating help is requested.

According to some embodiments of the invention there is provided a computer readable medium comprising computer executable instructions adapted to perform the method.

According to an aspect of some embodiments of the present invention there is provided a software program product for automatically cross-referencing problem information between code developers, comprising: a non-transitory computer readable storage medium; a problems dataset for storing a plurality of problem entries, each containing problem information of at least one problem; first program instructions for monitoring, via a network, problems in one of a plurality of software programs, each executed on one of a plurality of client terminals; second program instructions for storing in the problems dataset problem information of at least one of the problems; third program instructions for detecting a new problem occurring in a first client terminal of the plurality of client terminals; fourth program instructions for analyzing the new problem to identify at least one similar problem in the problems dataset based on the problem information; and fifth program instructions for presenting to a user of the first client terminal an indication of the at least one similar problem to assist the user in eliminating the new problem; wherein the first, second, third, fourth, and fifth program instructions are executed by at least one computerized processor from the non-transitory computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
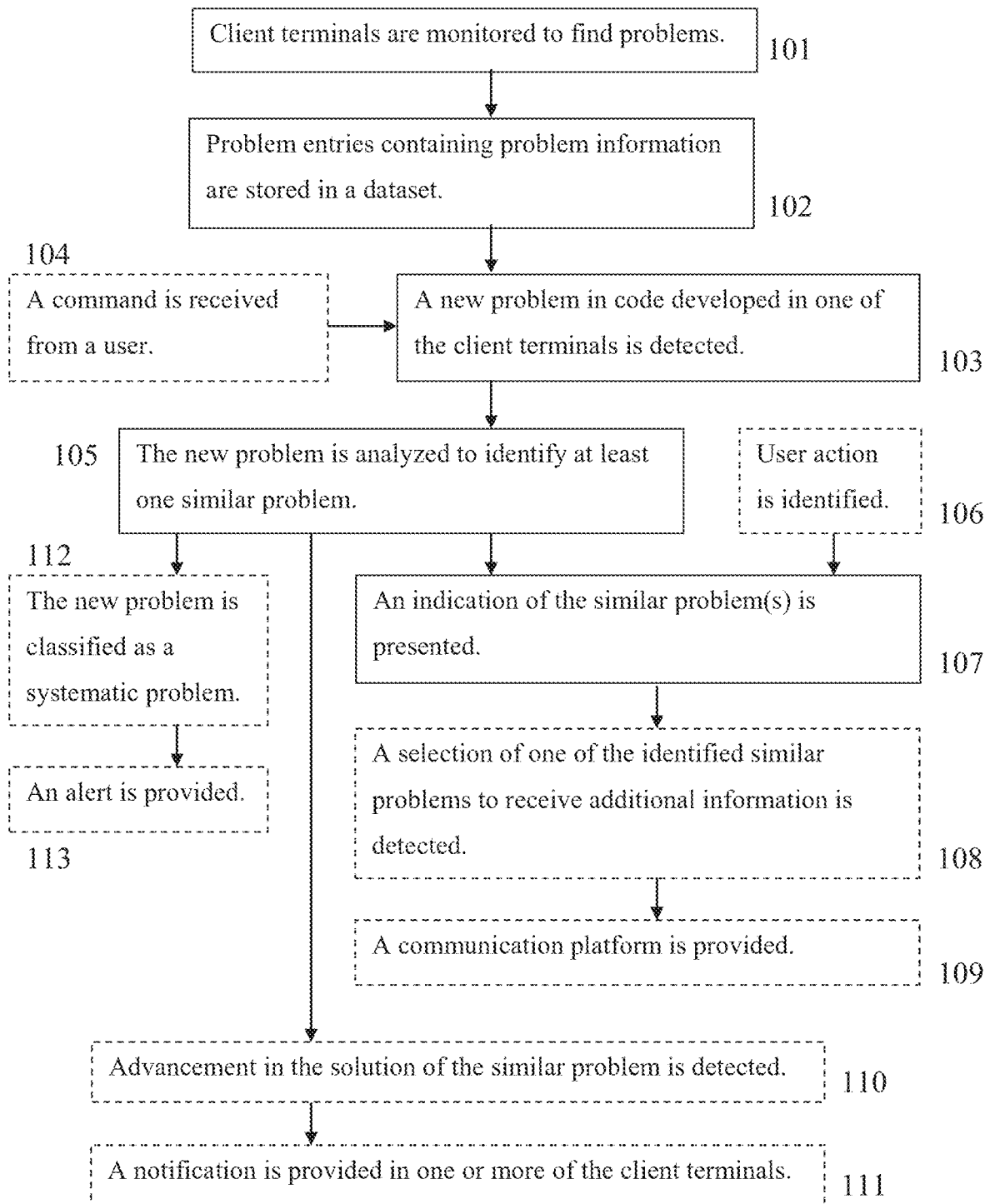
FIG. 1 is a flowchart schematically representing a method for automatically cross-referencing problem information between code developers, according to some embodiments of the present invention.

The present invention, in some embodiments thereof, relates to tools for solving software related problems and, more particularly, but not exclusively, to cross-referencing problem information between code developers.

According to some embodiments of the present invention, there are provided methods and systems for managing real time distribution of concise information and solutions relating to problems occurring in and/or indicated by software. The distribution allows a user who encounters a problem to receive guidance from one or more other users who previously encountered, made progress and even completely overcame the same or similar problem. For example, a software developer may encounter many types of compilation and/or runtime errors and problems.

Currently, a developer may be assisted by colleagues to solve a problem. However, his colleagues may not have encountered a similar problem and/or solved it, he may not know which one of his colleagues did encounter a similar problem and/or may not know his colleagues well enough to approach them, for example in a large organization. A developer may also search publically available information online, for example in developers' forums and/or blogs, however such search may be time consuming and may not always result in finding a similar problem or a solution. Also, in some cases, searching online is not an option, for example within classified networks and/or for internal systems that are custom made for the organization.

The methods and systems are based on a monitoring mechanism for monitoring multiple software programs. Optionally, the monitored software programs are related to code development, for example, integrated development environments (IDEs), running on multiple client terminals for example in an organization or other group and module(s) which detect problem(s) in the code developed at the IDE level. The methods and systems are optionally supported by a central server that manages storage of information regarding problems and suggested solutions in a problems dataset, or optionally are based on peer to peer communication in a distributed platform. When a new problem is detected in one of the plurality of monitored IDEs, the problem is analyzed to find similar problem(s) in the problems dataset, based on the stored problem information. The IDE or a module installed in the IDE or separately then presents, for example in the graphical user interface (GUI) of the IDE, an indication of the similar problems found and optionally their solutions, so as to allow a user to solve the problem. For example, a list of similar problems encountered by each developer, color indication of solution status of these problems, and/or an option to communicate with other developers which encountered each of the similar problems is presented by the IDE, installed module or agent.

The indication may include information of which of the other relevant developers having the same or similar problem, did not solve the problem, may have solved the problem, solved and verified that they had solved the problem, advanced in the solution of the problem, know how to temporarily disable the problem, may provide further information or advice on advancing toward a solution and/or even eliminated the problem and/or may provide guidance. This enables the developer to interact with the other developer(s) who solved the problem or made progress, and save time using the knowledge that was already acquired. The indication may be presented in form of a list, which may be sorted and/or filtered based on multiple parameters.

In an organization, when the IDEs are sharing the same code, for example via a code management repository such as GIT or SVN, the indication may allow developers to know the status of problems even when another developer working to solve the problem hasn't yet saved the changes in the main repository, and optionally which check-in or push solved the problem. This may also be useful for example when the developer who solved the problem no longer works in the organization and cannot explain the solution himself.

The methods and systems may also be used for solving other software related problems and/or problems monitored by software, for example by sensors. They may be used in many fields to connect users experiencing similar problems and exchanging information regarding the problems and status of their solution. For example, problem in a car (by connecting to the car's computer) and/or a smart device in a house, to see which of the user's friends had the same problem, and/or an electronic medical sheet, to see which communities, such as social media communities, deal with a problems discussed in the medical sheet. This may also include a textual request which states the problem and/or how much the user is willing to pay for someone to solve the problem.

According to some embodiments of the present invention, there are provided methods and systems for providing developers with concise and ordered summary of events occurring during the running of a code, for example developed in an IDE. The running of the code is monitored by a runtime analyzer module, and the output of the running code is analyzed to detect important events mentioned in the output. The important events are then presented to the user in a list. The runtime analyzer serves as a bulletin board which displays a summary of all the important events which have been displayed in the IDE. Its main purpose is to enable the user to see a summary of the events hidden and/or hard to spot in the large amount of text, poured into the display during runtime. Optionally, other information and/or actions are available to the user from the list, such as full error text (such as full stack trace of an exception, which may be accessible for view even when the text had been already removed from the display, for example, after reaching the maximal characters capacity), colors indicating existence of a solution to the event and/or option to query for help regarding the problem.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
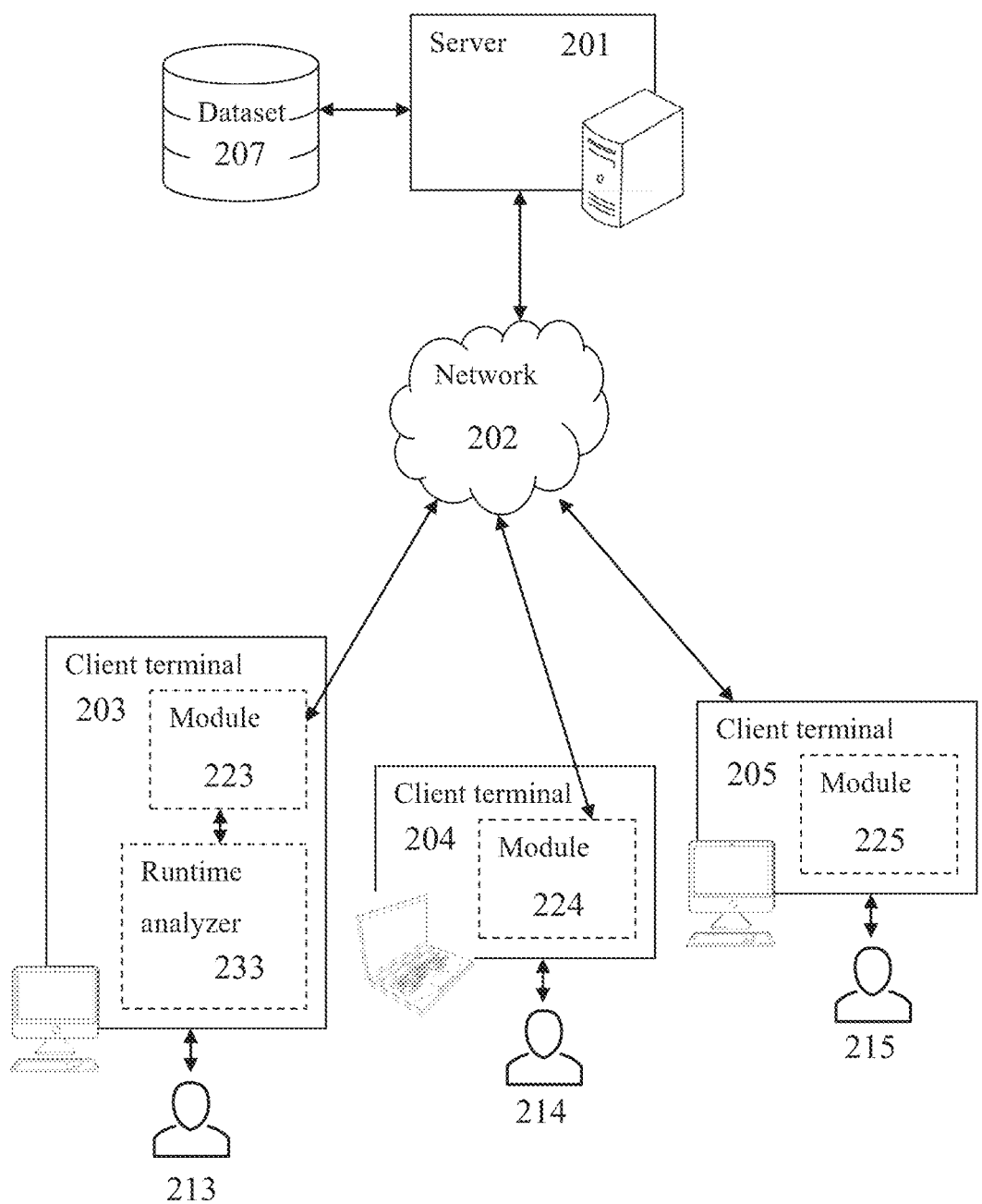
FIG. 2 is a schematic illustration of a system of automatically cross-referencing problem information between code developers, according to some embodiments of the present invention.

Referring now to the drawings, FIG. 1 is a flowchart schematically representing a method for automatically cross-referencing problem information between code developers, according to some embodiments of the present invention. Reference is also made to FIG. 2, which is a schematic illustration of a system of automatically cross-referencing problem information between code developers, according to some embodiments of the present invention.

First, as shown at 101, IDEs executed on client terminals 203-205 are monitored by modules 223-225 to find problems occurring in code developed in the IDEs. Client terminals 203-205 are used by developers 213-215 respectively.

Client terminals 203-205 may include, for example, a personal computer, a workstation, a production server, a mobile device such as a Smartphone, a tablet, a wearable device such as Google glass, a Smart watch, a laptop computer and/or the like, and/or any device that has one or more network communication modules, such as a network card or chip. Developers 213-215 using client terminals 203-205 may be limited to subscribed users, developers in any kind of an organization, team and/or any kind of a group defined as a sharing group in the system.

The IDE may include any software and/or hardware program allowing programmers to write, edit and/or test executable code, for example, any version of Eclipse, Microsoft visual studio or JetBrains' IntelliJ. The IDE is executed on client terminal 203-205, and may be executed on one or more processors, for example, as a local application, a web service accessible for example using a web browser, a remote service provided by remote one or more servers and/or a web robot (bot) connection. The IDE may include a console (as it is called in Eclipse, or an equivalent, such as 'output' as it is called in Microsoft visual studio).

Modules 223-225 may be an integrated part of the IDEs, may be an add-on to the IDEs or may be a program executed separately from the IDEs. Optionally, the module(s) is installed remotely, for example on a remote or local computer, server and/or machine, and not through the IDE. For example, when a programmer debugs his software by running it on a remote machine without any connection to his IDE, a software may be installed on the server, constantly get data from it (for example by a constant reading of the log file and/or by integration (e.g. integrating to the JVM)), and pass that data to a server 201. For another example, when a programmer wants to test his software on a remote server, the module(s) is installed on the server.

The code may be in any programming language, for example, HyperText Markup Language (HTML), Java, JavaScript, C++, C#, Swift, objective-c and/or any other language.

The problem(s) may include, for example, compilation and/or runtime errors, code lines, exceptions, log lines such as warning, trace, debug, info, user defined issues (for example entered by the user as free text) and/or any other problems and/or issues. For example, a compilation error may be a missing file in the code repository which is referenced in a configuration file.

Then, as shown at 102, problem entries are stored in a problems dataset 206. Each problem entry contains problem information of at least one of the problems discovered in the monitoring of client terminals 203-205.

Problems dataset 206 may be any kind of structured data collection that allows access to stored data. Problems dataset 206 may be stored in a memory, which may include, for example, a digital data storage unit such as a magnetic drive and/or a solid state drive. The memory may also include, for example, a content delivery network or content distribution network (CDN) that is a large distributed system of servers deployed in multiple data centers across the internet.

Optionally, the storage of the problem entries in problems dataset 206 is managed by a server 201 connected to client terminals 203-205 via a network 202. Optionally, client terminals 203-205 are connected to each other via network 202 and the storage of the problem entries is managed for example by a peer to peer (P2P) protocol.

Server 201 may include one or more computing devices, for example, a mainframe computer, an enterprise server, a workstation, multiple connected computers, a virtual server and/or a personal computer.

Network 202 may include, for example, local area network (LAN), a wireless network such as mobile network, wireless local area network (WLAN) such as Wireless Fidelity (WiFi™), a wireless personal area network (WPAN) such as Bluetooth™ protocol and/or any other network. Network 202 may be local, for example an internal network of an organization, or may be a general network, such as the internet.

The problem information in each problem entry may include any kind of data related to the detected problem(s), for example, error and/or exception text, related code segments, code packages and/or libraries included in the code, methods being called in the code relating to the problem, stack trace status and/or values of relevant variables when the exception occurred, date and time, a username of the developer, notes entered by the developer and/or any other related information. The text of the problem may include, for example, text pieces which are identified as important such as logger error messages, simple error messages such as an exception stack trace displayed for example on the console (e.g. Eclipse's Console area (for example—Luna version)). The text may also include free text, for example as added by the developer, which may be structured or not structured. The user may mark a specific text segment (or optionally a whole line may be marked), and define it as a problem to quarry. In programming languages such as C++, error messages don't necessarily carry a defined template, so programmers may just print text into the console, not necessarily use the log service, and the text will be displayed in the log and/or on the console, unformatted. In that case, because it describes an event which may be a problem and/or error, the user may want to question an unformatted text.

The problem information may also include information relating to the solution of the problem, for example whether the problem is solved, unsolved or that some progress was made toward a solution. The information relating to the solution status may be obtained, for example, by detecting that a problem did not reappear after a certain number of runs of the developed code. For example, when a problem has stopped appearing in the last 8 runs, then there's a chance that the problem had been solved, and it may be automatically marked as 'advanced' or as solved without a user's explicit indication. The information relating to the solution may also be stated by the developer, for example by indicating and/or confirming that he had solved the problem, or any other status of the solution. A confirmation for a solution may be decided, for example, by positive votes by other developers, who examined the solution and found it to be helpful. A confirmed solution may be decided when a threshold number of votes is obtained. Also, when negative feedback for the solution is received, the status may be changed, for example to 'advanced' instead of 'solved'.

A feedback on the solution may be requested from the developer, to confirm that the problem is solved. This may be done, for example, by prompting a request to the developer. When more than one problem is solved by a developer, a maximum number of requests for confirmation may be set, in order to avoid annoyance from too many requests. The maximum may be set, for example, per each day. The requests for confirmation may be prioritized, for example according to the number of developers currently encountering the same problem. Some techniques may be applied to encourage developers to report and/or confirm solution status of problems, for example, presenting to the developer the number of other developers currently encountering the same problem to show him how many people he would be helping, and/or incorporating a mechanism for users to collect points for supplying solution feedback and/or information and gain rewards such as a colored name or icon in the list of solutions shown to other users. In an organization, developers may also be credited for helping other and therefore further contributing to the organization. This may also help managers identify specific developers who are excelling in solving problems. The prompting may be done, for example, by a popup message, by presenting the requests in a specialized window and/or by presenting a line relating to each solved problem in the runtime analyzer window (as described below), for example at the top of the item list so it is visible when using the runtime analyzer and accommodates items' space until it is addressed by the developer.

The solution information may include, for example, explanation of the solution by text, image(s), audio, video(s), link(s) and/or any other format.

Then, as shown at 103, a new problem is detected by module 223. The problem is occurring in code developed in one of client terminals 203-205, for example client terminal 203. Optionally, an indication of a detected problem is presented in the GUI of the IDE, for example by a color marked on the text of the problem. Optionally, the indication is presented to a project manager and/or distributed to other users and/or client terminals.

Optionally, as shown at 104, the new problem is detected in response to a command and/or an action by developer 213 that is received for example via the GUI of the IDE. Developer 213 may invoke detection of a new problem, for example by clicking on problem text in the IDE and/or performing a search, for example using the problem text from the IDE. Optionally, when a large number of searches are made for a specific text by different users, the text is then classified as a problem. Optionally, developer 213 may be prompted to confirm whether the searched text is indeed a problem.

The new problem may also be detected by analyzing a static file, such as a log file, that is sent by developer 213. The file may be sent by the user to server 210 and is analyzed by server 210 to find problems. The file may be related to the code developed by developer 213 in the IDE, for example a log file from a server, so they are analyzed together, to best identify the new problem and optionally differentiate the developer's code from text messages (e.g. errors) generated by third party libraries such as Spring framework or Jersey, or infrastructure such as a Tomcat web server. The new problem may also be detected by analyzing a dynamic log file which is constantly updated, for example in a production environment running on a production server.

Then, as shown at 105, the new problem is analyzed, based on the problem information in problems dataset 206, to identify at least one similar problem. The analysis may be done by module 223 and/or by server 201.

The analysis may be based, for example, on finding similarities in the text related to the problems and/or the information of methods being called in the code relating to the problem and/or the problem text from the IDE.

Optionally, a degree of similarity is determined for each identified similar problem. A low similarity may be determined, for example, when a problem is found that relates to a different set (or a subset) of method calls, however some of the methods sequence(s) are similar. For example, a code in a first client terminal has an exception thrown in function f3( ), after a sequence of function calls, during which a function named f1( ) calls a function named f2( ) and f2( ) calls a function named f3( ) which throws an exception. A code in a second client terminal calls a function named f4( ) which calls f3( ) which throws the same exception, which is solved by the developer working on the second client terminal by fixing f3( ). Although the sequence of function calls in both cases is different (f1=>f2=>f3 as opposed to f4=>f3), the problems may be identifies as similar, as the fix in f3( ) may also solve the problem occurred in the code in the first client terminal. Some similarity may also be found, for example, when similar text of an error or problem occurs for two different classes and/or in different context. For example, similarity may be detected when the text of two exceptions and/or the text of messages accompanying the exceptions have a predetermined percentage of similar words, for example 70%, 90% and/or any other number. Optionally, the percentage is determined by the length of the texts. This is done to detect similar texts which include for example different parameter values.

Finally, as shown at 107, an indication of the similar problem(s) is presented. The indication may be presented by the IDE and/or by module 223, to assist developer 213 in eliminating the problem.

Optionally, the indication is presented to developer 213 via a GUI of the IDE, and/or by an agent connected to the IDE. The GUI may include an input device, for example, keyboard, touchscreen, a digital surface and/or pointing device such as, for example, a mouse and an output device, for example a monitor, a projector and/or a screen. Optionally, parameter of the presented indication may be configurable by developer 213, the system managers and/or by any other entity. Optionally, the indication is presented to an application installed in client terminal 203, for example a third party application and/or a bot algorithm.

Optionally, as shown at 106, the presentation of the indication may be invoked by an action of developer 213, for example by a button or a right click over the text of a problem, by hovering the problem entry with a mouse cursor, via the GUI of the IDE. This may be done, for example, by module 223. Optionally, an action in a menu is presented in the GUI of the IDE which include options to invoke an indication of similar problem(s), for example, an action called "Get help" (or "GELP").

Optionally, the indication of the similar problem(s) may be presented automatically by the IDE or module 223, for example when developer 213 manually identified a problem and/or when developer 213 actively searched for a solution using the text of the problem.

Optionally, the indication of the similar problem(s) may be presented by the IDE or module 223 in the form of a list of entries, each relating to one of the identified similar problems. The list may include, for example, names of developers which encountered each problem, date of the problem, status of the problem (solved, unsolved or progress made), degree of similarity to the new problem and/or other problem information from the problem entries stored in problems dataset 206. The list may be presented, for example, inside a menu, in a separate tab and/or in a separate window.

Optionally, the list is sorted to provide the best solution(s) at the top of the list. The sorting algorithm may take into account, for example, the degree of similarity of each problem to the new problem (most similar problems are presented higher on the list), status of the problems (solved problems are presented higher on the list), relation of the developer which encountered each problem to developer 213 (for example problems encountered by team members and/or previously contacted developers are presented higher on the list), developer's position in the organization, online status of the developer, developer's language, number of previous requests made to the developer (when a developer already helped many other developers recently, his solutions are presented lower on the list to prevent overload), time of day, and/or any other sorting criterion or combination thereof. The sorting algorithm may be executed, for example, in module 223 and or in server 201. The sorting may be, for example, predefined in module 223 or may be defined by the developer 213, the system managers and/or by any other entity.

Optionally, the list is limited to present only some of the identified similar problems, for example a maximal number of entries, only the most recommended similar problem or problems based on the analysis and/or only some problems based on any criterion as described above. For example, the list includes only problems encountered by developers working in the same organization, developers who joined or were added to a group, developers who are defined as friends and/or any other group. The limitation may be, for example, predefined in module 223 or may be defined by the user, the system managers and/or by any other entity.

Optionally, the indication includes coloring the text in the IDE relating to the new problem, based on the identified similar problems, for example according to the status of some of the problems. The colored text may include the problem message, any part of it, its cause description and/or any other related text. The colored text in the IDE relating to the new problem coloring may be selected as most indicative of the new problem. This may be done, for example, as described below, for the runtime analyzer or the console. The coloring may also help a developer to easily identify the lines related to a problem out of the very long text of code, logs, and other output. For example, when another developer have had a similar problem and managed to solve it, the problem message may be colored for example in green, to reflect that this problem has been solved. When a solution is also described in the problem's entry information, the problem message may be colored for example in blue. When another developer has made progress but that progress is not classified yet as one which solves the problem, the text may be colored for example in yellow, to reflect that there's some progress regarding this problem, yet this progress has not been classified yet as a solution. When there are currently no other developers found who solved the problem, the text may be colored for example in red.

Then, optionally, as shown at 108, a selection by developer 213 of one of the identified similar problems is detected, by the IDE or module 223. developer 213 may select for example a problem identified in client terminal 204, to receive additional information. This may be done by developer 213, for example, by selecting an entry from the presented problem list. The additional information may include, for example, any of the problem information included in the relevant problem entry stored in problems dataset 206, data of the analysis of the similarity between the new problem and the selected similar problem, contact information of developer 214 and/or any other information.

Optionally, as shown at 109, a communication platform, such as a chat, is provided between modules 223 and 224 to allow developer 213 to communicate with developer 214 and get his help in solving the new problem. Optionally, the communication platform includes an option to share data from the IDE of client terminal 203, for example the content of the currently active console, a description of a relevant problem text segment a full stack trace of an exception with or without any additional information, such as the status of the stack trace when the problem occurred, and/or a full or partial memory snapshot. This allows developer 214 to better understand the context of the new problem. Optionally, the communication platform includes an option to provide remote access to client terminal 203, for example via remote control (such as logmein or TeamViewer) to allow developer 214 to directly perform changes the IDE work environment in client terminal 203. Optionally, the communication is recorded, and the recording is added to the problem information included in the relevant problem entry stored in problems dataset 206.

Optionally, the communication platform, the IDE or module 224 provides developer 214 with information relating to the new problem and/or the similar problem. this may include, for example, any of the problem information included in the relevant problem entry stored in problems dataset 206, date and time of solving the similar problem, the commit that included the solution, data of the analysis of the similarity between the new problem and the selected similar problem and/or any other information. This may help developer 214 to be reminded of the problem he encountered and/or better understand the similarity between the problems.

Optionally, the IDE or module 223 provides information to developer 213 relating to code changes detected by module 224 which were made by developer 214 when he solved the similar problem. This may be done, for example, through integration to various source control programs, such as GIT, SVN, Source safe and/or Microsoft's TFS. For example, developer 213 may see a list of changes made in the code repository by developer 214, done in the time frame a problem had been solved, and inspect the code which corrected a the problem. This may provide valuable information on how the similar problem was corrected earlier, by merely tracking the source code changes.

Optionally, as shown at 110, when the status of the solution for the problem is changed, for example when the problem is now identified as solved and/or some progress is made toward a solution by at least one developer, a notification is provided to developer 213, as shown at 111. The notification may be provided, for example, by the IDE or module 223 and may include information on the solution or progress, the identity of the developer who solved the problem or made the progress, and/or any other information. Optionally, the notification is provided to some or all of the developers which encountered a similar problem and/or to developers which still have a similar problem detected in their console.

In an exemplary scenario of using the system, a first developer, working on a computer connected to a private network of a company, has an exception during code development, which relates to a bean creation in a Spring framework. The problem is identified by an add-on program that is installed on the IDE that is used to support the code development, and a message including the details of the exception is sent from the computer to a server via the internal network, and the details are stored in a dataset inside memory storage of the server. That first developer solves the problem and moves on. The add-on program identifies that the problem was solved and optionally presents to the developer a request to confirm and/or describe the solution. The confirmation and description of the solution are sent to the server to be stored in the dataset. A second developer who is working on a second computer connected to the private network of the company, is having the same type of problem (not necessarily the same bean, but the same problem). A similar add-on program, which is installed on the IDE in the second computer, identifies the problem. The add-on program sends the problem details to the server, which identifies the first problem as similar (similar because two different pieces of code, form two different methods, functions and/or code segments, have the same type of problem when interacting with an infrastructure). The exact location in the code which calls the infrastructure which eventually causes a problem is different in the two situations, but the problem is similar enough for the system to identify that the similarity is good enough to recommend both developers to interact. The add-on program then presents to the second developer an indication that a solution may be available, by coloring some of the text line of the exception. The second developer then hovers and/or clicks on the exception text and the add-on program presents options relating to the problem. The second developer then selects to view the details of the solution as provided by the first developer, and the first developer's email address. When the second developer fails to solve the problem using the provided information, he uses the provided email address to contact the first developer and ask for his help. The first developer answers and explains the solution, and the second developer solves the problem. The solution by the second developer is then updated in the relevant problem entry stored in problems dataset 206.

Figure 3A:
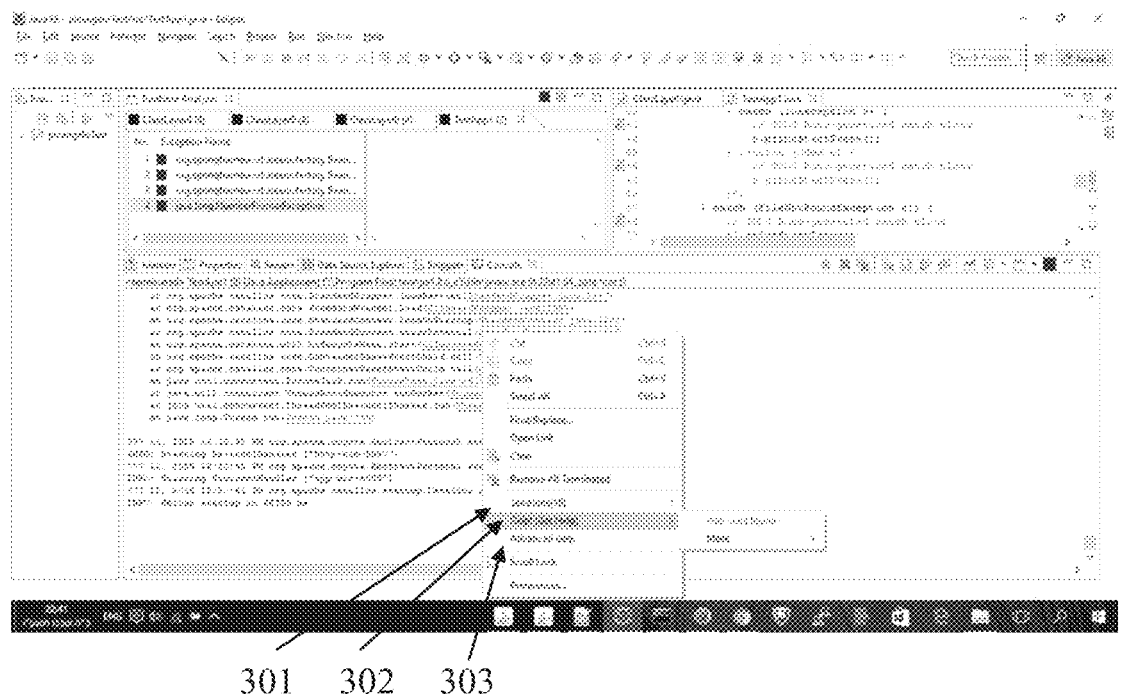
FIGS. 3A, 3B, 3C, 3D and 3E are screenshots of an exemplary integrated development environment (IDE) graphical user interface (GUI), including a system for automatically cross-referencing problem information between code developers, according to some embodiments of the present invention.
Figure 3B:
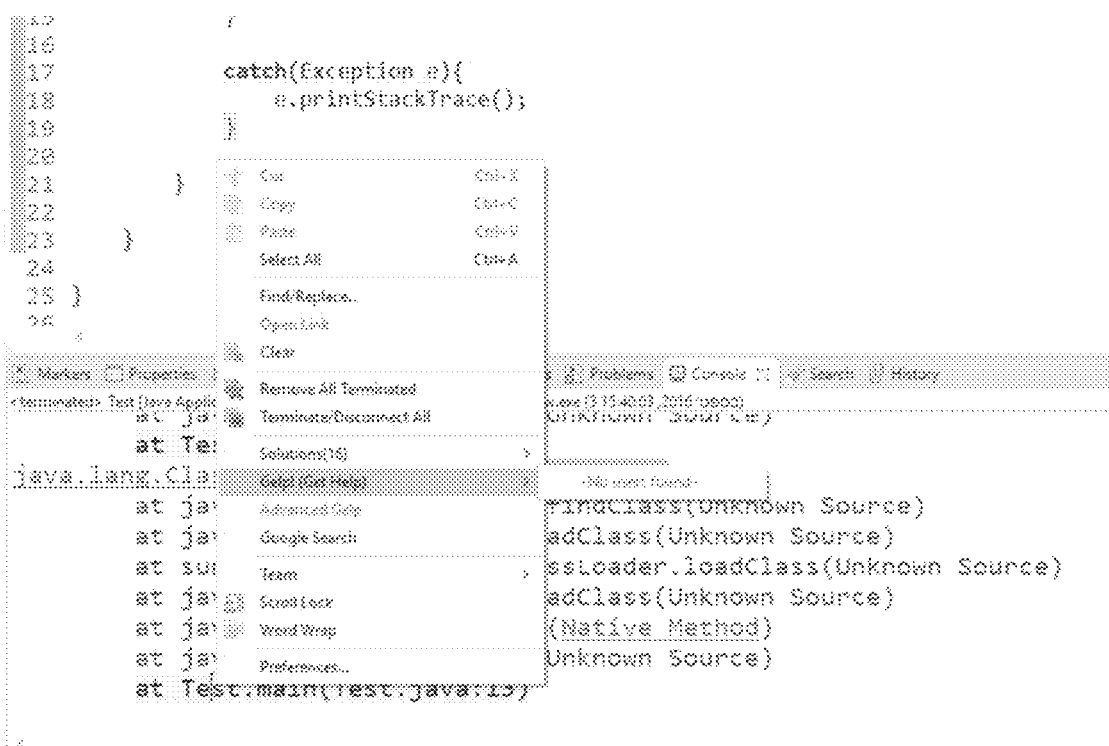
Figure 3C:
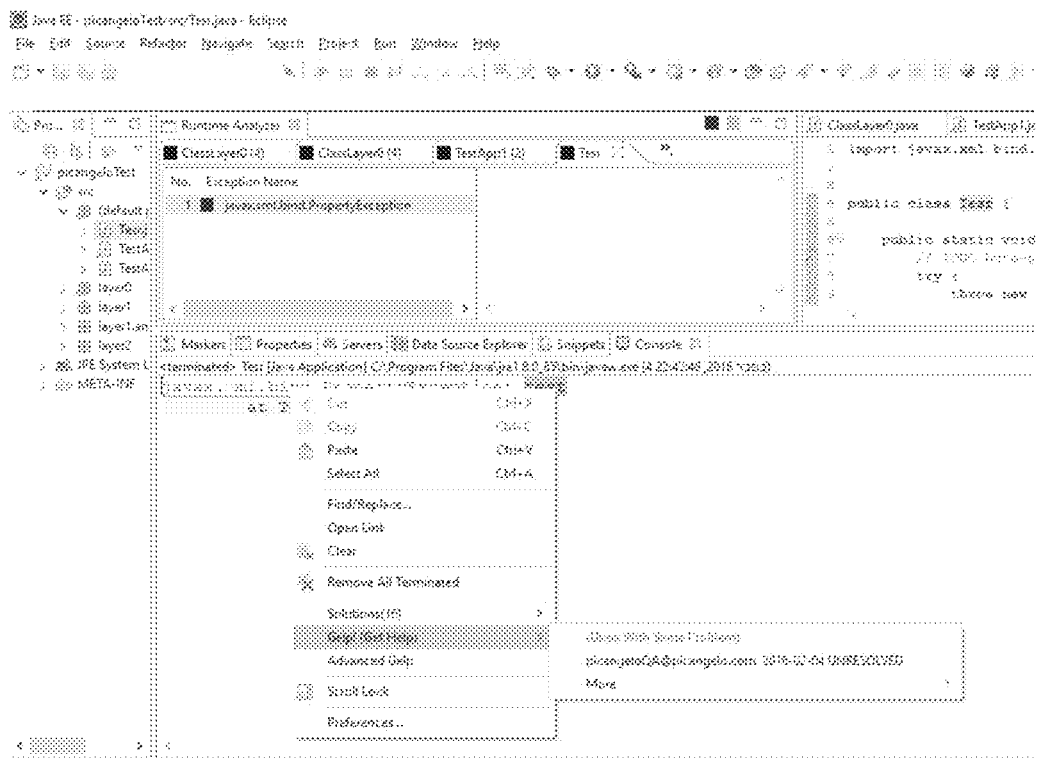
Figure 3D:
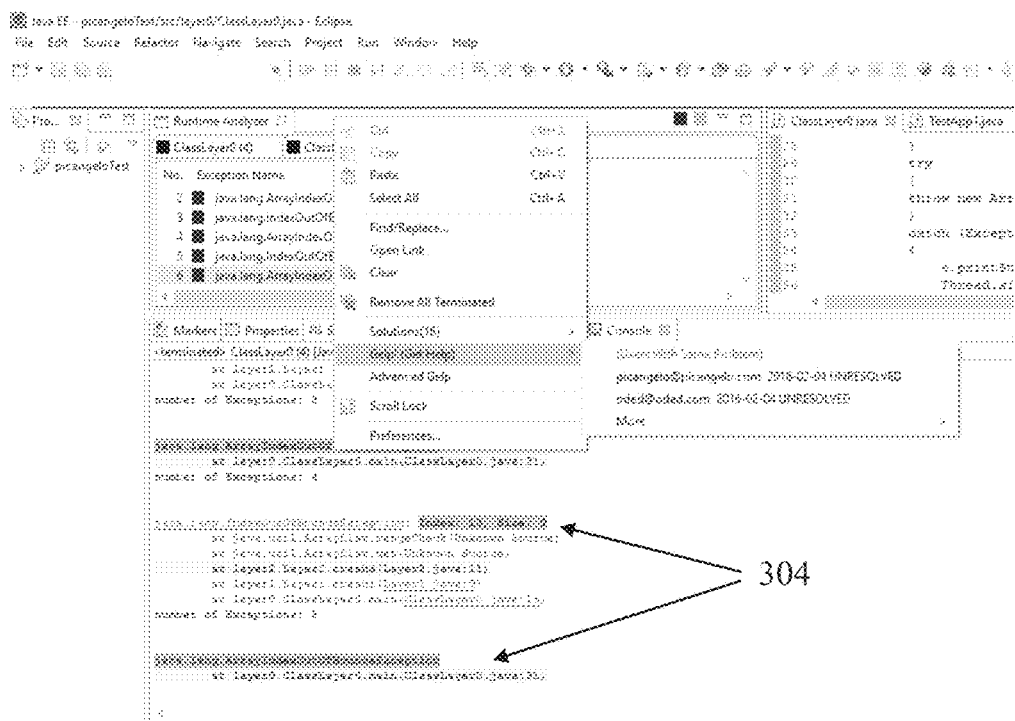
Figure 3E:
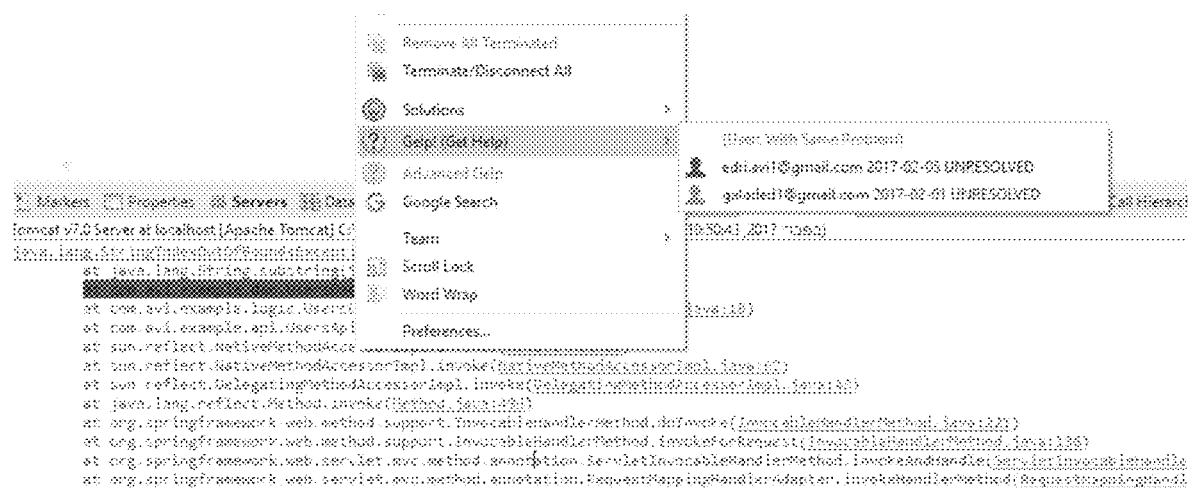

Reference is now made to FIGS. 3A, 3B, 3C, 3D and 3E, which are screenshots of an exemplary IDE GUI (Eclipse), including a system of automatically cross-referencing problem information between code developers, according to some embodiments of the present invention. When a developer right-clicks on any character which is part of the exception's stack trace, option(s) are presented in the menu to get help. The menu includes a list of similar problems encountered by other developers, as shown at 301, and a list of suggested solutions entered by developers having similar problems, as shown at 302. In FIGS. 3C 3D and 3E, the list of problems includes the email of each developer, the date of the problem, the status of the problem (UNRESOLVED) and optionally the online status of each developer. The menu may also include advanced option(s), as shown at 303, such as search and/or sending a log file for analysis.

Optionally, the menu includes an option to search publically available information online. This frees the user from having to identify the right words to search in the search engine, such as Google. The system identifies key words such as the message's first 4-5 words and the exception's name, and inputs it in the search engine. The system may perform multiple search operations in the background, in order to choose the right set of words to use in the search query (an exemplary algorithm may be: choose the set of words from the message, which returns the highest amount of answers in Google, while removing words such as 'is' and 'the'). For unstructured data, such as free text, the user may mark the text he wants to search, and initiate a direct search on the marked text. This saves the time of the user, as instead of deciding which words he'd choose for his query, opening the browser and then writing them, this is done automatically.

Optionally, an indication, for example by colored text, is presented to developer 213 to direct him to the correct text in the IDE which is relevant for solving the new problem.

Optionally, developer 213 may publish a request for help to the relevant developer who encountered the similar problems. A message is sent from module 223 to the relevant client terminals, optionally via server 201, and the other developers may respond and offer their help. The request may also include an offer of payment for the help and/or for solving the problem. The request may also include a bidding process, to find the best offer of help. This may be done, for example, for users of different organizations, so payment is transferred between the organizations by the system and/or facilitated by the system. The payment may also be arranged and/or transferred, for example via server 201.

Optionally, when a solution to the new problem is detected, for example when developer 213 successfully eliminates the new problem, a message is sent from module 223 to other client terminals in which similar problems were identified, optionally via server 201, to indicate to the developers using these client terminals that a possible solution to their problem is found. This may include visual, sound and/or any other indication.

Optionally, problem statistics and/or reports may be provided, for example to managers in an organization, regarding the problems occurred in code developed by developers in the organization. This may be done by a module installed in a client terminal and/or by server 201. The statistics may include, for example, how many problems software developers have and/or whether many developers encounter the same problem. This may be provided, for example, as periodical reports for example by email, as an analytics interface for example via a browser, a visual indicator in the user interface of an IDE and/or by any other method. For example, when a developer created a problem, and other developers had already updated their code with that problem, an alert may be sent entities such as managers, applications and/or services, that a problem is currently spreading, allowing for example managers, to react fast before the problem spreads and may inflict more damage. Optionally, an alert and/or report may be presented to manager(s) and/or developers according to pattern analysis and/or matching of identified events. For example, an increase in the occurrence frequency of problems for multiple developers, a specific or similar new problem identified for multiple developers, and/or any other identified pattern.

Optionally, when a problem is classified as a systematic problem, as shown at 112, an alert is provided, for example to a manager, as shown at 113. Such a case may be detected, for example, by recognizing an identical problem at the same location in the code of more than one developer.

Optionally, an option to contact other entities in order to solve the problem may be presented to the user, such as a computer BOT or any other service.

Figure 4:
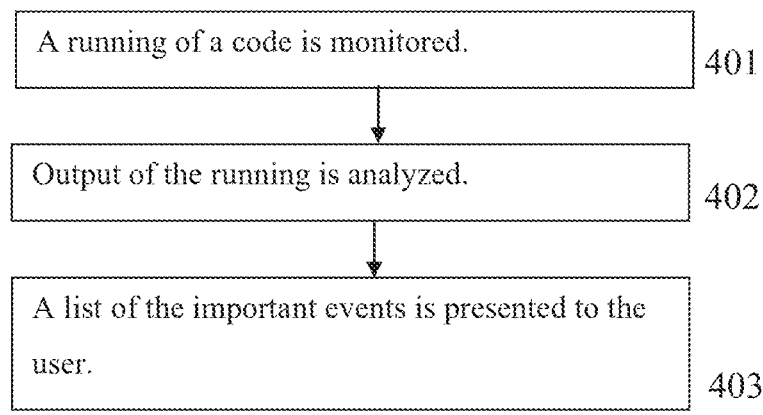
FIG. 4 is a flowchart schematically representing a method for summarizing runtime output text, according to some embodiments of the present invention.

Referring now made to FIG. 4, which is a flowchart schematically representing a method for summarizing runtime output text, according to some embodiments of the present invention.

First, as shown as 401, a running of a code developed in one of IDEs executed on client terminals 203-205, for example IDE 203, is monitored by a runtime analyzer module 233.

Then, as shown as 402, output of the running is analyzed by module 223 to detect important events mentioned in the output. Optionally, the important events are stored in a dataset to be used in the analysis of other runs of the code and/or other code.

Optionally, the output may be received from an external source, one or many, and not necessarily from the IDE's console. For example, the output may be a production's server log file. The data is sent using a program which runs along the production server, monitors the log file(s) and distribute the data in a to one or more client terminals, and shows an analysis of what is happening in the external source (this may be, for example, a production server and/or an integration server during development).

The important events may include, for example, exceptions, log events and/or text segments or expressions which people find interesting and query a lot, the user requested or defined as a problem and/or match a textual expression.

Figure 5A:
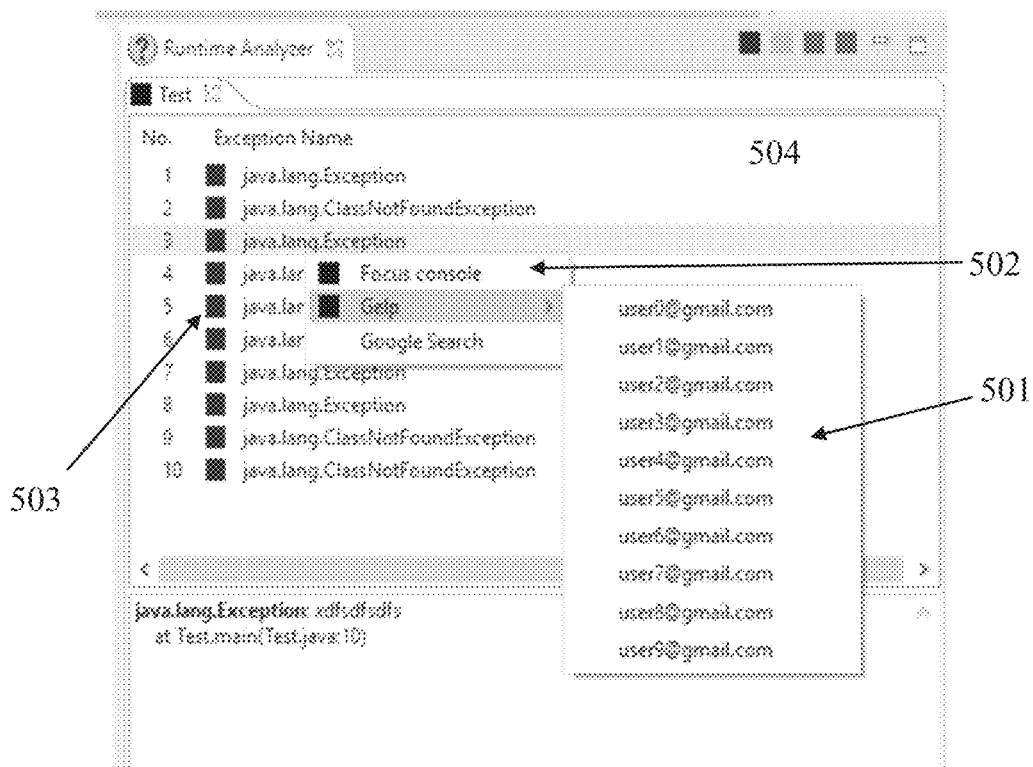
FIGS. 5A and 5B are screenshots of an exemplary IDE GUI, including a list of important events, according to some embodiments of the present invention.
Figure 5B:
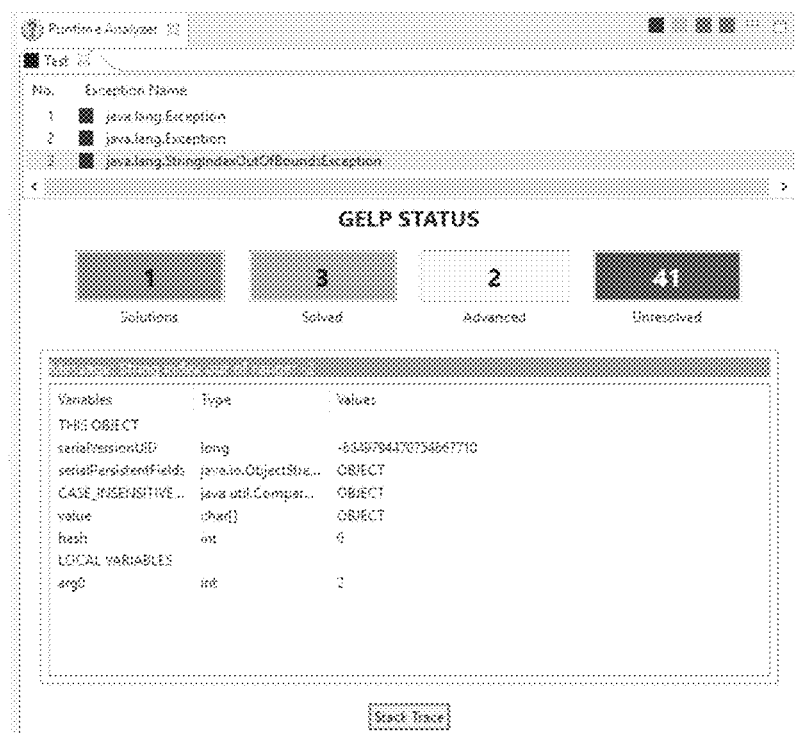

Reference is now made to FIGS. 5A and 5B, which are screenshots of an exemplary IDE GUI (Eclipse), including a list of important events, according to some embodiments of the present invention.

Finally, as shown at 403, a list of the important events is presented to user 213 of IDE 203.

Optionally, other information and/or actions are available to the user from the list. For example, a right click on an item in the list may provide an option to view a list of similar problems encountered by other developers and/or a list of possible solutions, as described above and shown at 501. For example, a right click on an item in the list may provide an option to focus on the error in the IDE's console, as shown at 502.

The list may include colors, fonts and/or other visual indications, indicating the status of the solution of a problem, as described above and shown at 503.

Optionally, the user may exclude an event of a specific type from being displayed in the runtime analyzer, for example when the user does not want to see a problem he's aware of, and yet wishes to "lower the noise" on the runtime analyzer and focus on the rest of the events. The user may also see the list of excluded events and cancel the exclusion.

Optionally, the list may emphasize new events, for example by displaying them first and/or by color or font. This may be done to better alert the user of the new events. Optionally, when a new event is added in the runtime analyzer list and is not viewed and/or missed by user 213, an indication of the new event is presented to user 213 to draw his attention. The indication may include, for example, a visual signal such as a flickering button and/or color change, a sound and/or any other indication. A new event may be identified as not viewed by detecting, for example, that the runtime analyzer window is closed, focused on a different tab or not viewed for a sufficient amount of time for reading, for example less than a predetermined number milliseconds.

Optionally, the list is presented in a runtime analyzer window. Optionally, each time the user runs a project, the runtime analyzer's data appears in a dedicated tab 504. Tab 504 may include a list (for example numbered 1, 2, 3 . . . ) of all the interesting events, and when an event is selected, may include all the information the system may provide on the event. The information may include, for example, a timestamp which states the exact time the event had occurred, solution status of the problem, number of available solutions, and/or the variables in the stack trace (primitives and/or objects) which are available at runtime. For an exception, the information may also include a snapshot of the variable values over the entire stack trace at the moment the exception occurred, the exception's message and/or list of messages when the same exception was wrapped in couple of exception layers, time stamp and/or the exception's stack trace. The information may include a list of commits to the code repository (for example with exact id of each commit and commit name), which may contain a solution that another user had applied to solve this exact problem. This does not demand the other user any involvement on supplying information on whether or not he had solved the problem or not, but automatically indicates that the specific problem may have been solved during the changes conveyed in a specific commit. Users may also confirm or deny that a solution reside in a specific commit, and so such a confirmation may be added to the data displayed to users.

Optionally, when the user clicks on an event in the runtime analyzer window, the focus in the IDE moves to the first line in the console relating to the selected event.

Optionally, each time the user runs a project, new tab is opened or replaces a current one. A new tab may be opened when this project does not appear in the list of open tabs in the runtime analyzer. When this project already exists there, for example when the console which the tab represents is terminated, then it is replaced by the new tab which contains information on the new run. When the project is still running (the console is not terminated), a new tab, optionally carrying the same name, may be opened.

Optionally, the user may access the last x occurrences of the runtime analyzer tabs (for example, x may be 5, so the user has access to the last 5 tabs which are not being automatically displayed, providing by that a "history" like mechanism. This enables the user to easily query history data in order to compare information pieces, or even to add metadata to it, in order to help himself and others to face the same problem the next time it appears (for example, a metadata which may be added to a problem is a list of links, such as internet URLs or intranet URLs, or even a solution to the problem.

Optionally, the runtime analyzer presents items relating to text that no longer appears in the console. An indication that the item is no longer available in the console may be, for example, a grey color to the text.

Optionally, the list may show unique items (only different messages), or may shrink (for example using a button click) to so every sequence of messages which are identical will become one line in the list, with an indication of how many occurrences the single item is hiding. For example (java.lang.NullPointerException (5) means the same problem appeared 5 times in a row, inside the list).

Optionally, the user may send a file, such as a log file to be analyzed by server 210, similar to the analysis done in runtime by the runtime analyzer. The results may be similarly displayed, for example in a log analyzer window with any of the functionality described above for the runtime analyzer.

Optionally, text in the IDE (for example in the console) may be marked in color, as shown at 304, to allow easy identification by the developer. This may include, for example, problems identified by module 223 as described above, exception, log messages, and/or free text.

For exceptions, in each type of a situation, an algorithm may be applied to each situation, and the algorithm decide which parts of the text are interesting to mark. For example, mark messages, mark the last method from the user's project/s and/or avoid marking functions which aren't part of one of the user's project. A class may be identified as a "user's class" when the user has a class by that same identical name (full qualifies name, i.e. class name and package name), in one of the projects accessible using his IDE (for example, all classes/Enums which reside in projects which reside in the same workspace in an eclipse environment (or existed as part of the user's history workspaces), or classes which reside in a project which is part of a solution (Visual studio environment)). The marking of errors from the console differ and treat differently to different situations, which differ in terms of "who causes" the exception and/or error. The cause may be, for example, a user's code, a third party code due to a user's call which may have provided bad data as parameters (For example, the user had written function f( ), and inside it he calls a function go which comes from a JAR or a DLL (Java or C++/C#) which is not a part of the project which the f( ) function is part of.), and/or a server error during load which had no direct relation to the user's code (such as bad configuration file).

Log messages may have a strict template, so they are automatically identified and marked. Some log messages may be customized by the user, and so log messages which do not qualify to a basic template may be categorized in later stages as log messages, by various possible methods such as: asking users to confirm which text lines represent a log output, and/or using a preset of templates, or by allowing users from the organization to insert their own template of log messages, the system will be able to identify various templates of log messages.

Optionally, users may define free text to be marked and/or be identified by the runtime analyzer. Users may enter textual expression templates such as regular expressions or even hard coded texts. This enables users to easily harness the system's ability to perform text analysis, and get notification based on their specific needs. For example, a user may get a notification and have the text marked, each time a web server had finished loading. He takes the text marked when the web server finishes loading, describes it either as a hard text block or as a regular expression (a template) and adds it to the set of text segments the system marks on runtime. The user may also add a description which describes the meaning of this template (e.g. "The web server is now up and running") and the text segment he had chosen is marked whenever it appears on the console and may also publish its appearance as an event which appears in the runtime analyzer window. The user may also select a color for the text segment that appears in the runtime analyzer window. Optionally, the user provides a title, and so each time the runtime analyzer detects that this piece of text, that item will be presented in the list with the title the user had chosen to describe the event.

Optionally, the user may add links to a text segment for example in the IDE's console and/or the runtime analyzer window. The links may be stored in a dataset in the client terminal and/or the server. The links may be related to a solution of a problem, or in any way to the segment of text. The links may be available to the user and optionally to other users having similar problem, as described above. The links may be displayed, for example, when a computer mouse cursor hovers on the text segment. A list of links added by different users may be displayed to a user, for example links added by users of the same organization. The text segment may be for example identified and displayed by the runtime analyzer, identified as a problem, defined by the user and/or any other kind of text as described above or otherwise meaningful.

The links may include plain text describing a problem without any strict format to it. It may include a link to an article, which may reside for example, in an internal organization's Site, like Wikipedia (An internal Wikipedia server, dedicated for documentation of the organization's assets, problem+solutions etc) or Sharepoint, to an internet website such as StackOverflow and/or to any other location.

The user may be prompted to add a link, for example by a popup and "add a link" button. The user may add a link by access to history of error messages, for example by right clicking one of the examples. The user may add a link to a problem displayed on the console and/or the runtime analyzer for example by right clicking it and clicking an "add link" menu item, which adds the link. Getting the link may be done for example by copying an address from the browser. The user may add a link to a current problem appearing in the console and/or the runtime analyzer window.

Optionally, an explanation of an error message is displayed to the user, for example when hovering with the mouse cursor over a text segment. Error messages as defined inside a programming language, or a text displayed over the console due to an output devised by a programmer, may not be descriptive and/or may carry a low degree of clarity (the error message and/or text is not written clearly enough to easily explain the nature of the problem, let alone suggest a solution). The text segment is identified as a text segment to which has a predefined explanation (an explanation or a comment the user had manually inserted). The text segment may be identified by the system, or may match a regular expression defined inside the system. Then, the explanation is displayed, optionally in the native language of the user. This may include, for example in a tooltip, an explanation to the cause of the problem and/or suggestion(s) on how to solve the problem. Optionally, the user may share the explanation with other users.

For example, an error message which states "Major minor version" could be easily explain in "You are trying to run a program which uses a library (a JAR file). The Jar file has been compiled using a JDK newer than the one you're trying to run program with. System's suggests that you either recompile the JAR with the same JDK. You use to run the software, or do the opposite and run the software with the same JDK used to compile the JAR with. Either way—the JDK you're running the software must be at least new as the one used to compile the JAR with, if not newer".

Optionally, a user may define a regular expression, which is then identified by the system. The user may define the regular expression for example by marking a text segment, right clicking on the text segment and selecting an option from the menu such as "Define as regular expression". The regular expression may be identified as a problem to be solved according to the user's definition, may be identified by the runtime analyzer and/or log analyzer, and may be marked with color in the IDE's console and/or any other action defined by the user. The text of the regular expression may include text sections which may be different for each identified instance of the text segment, such as variable names, parameters and/or values. The regular expression may include metadata relating to the text segment, such as a name, description, comment, date and/or any other information. The regular expression may be shared with other users who may benefit from it but did not define it themselves, for example in the same organization and/or to a list of friends. A shared regular expression may be available for the other users, so each user may select whether to use it or not. The regular expression may be regulated by rules; for example, when three massages appear then a new defined expression appears to indicate a complete action. A regular expression may be deleted, restored, deleted only after a predefined time (for example 24 hours), permanently deleted after a predefined time (for example one week) and/or expire. A deletion request may be published and may be canceled by other users. This may be defined to prevent deletion of a regular expression by a user when it is still used by another user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant code development tools will be developed and the scope of the term code development is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of automatically cross-referencing problem information between users, comprising:
    using a plurality of code add-ons connected to respective integrated development environments (IDEs) executed on at least some of a plurality of client terminals that are connected with a server over a network, for:
        monitoring a plurality of log files each generated in runtime by an execution of one of a plurality of software programs which is executed with one of the plurality of code add-ons connected to one of the plurality of IDEs on one of the plurality of client terminals;
        analyzing the plurality of log files to identify a plurality of problems by identifying a plurality of regular expressions associated with the plurality of problems in the plurality of log files, the plurality of regular expressions are stored in a plurality of problem entries on the server, each containing problem information of at least one of said plurality of problems, wherein at least one of said plurality of problems of the plurality of problem entries stored on the server is associated with a status indicative of unsolved;
        analyzing commits to a code repository of the plurality of software programs to identify a solution to at least one of said plurality of problems of the plurality of problem entries stored on the server associated with the status indicative of unsolved;
        providing the solution to the server for updating the respective problem entry of the at least one of said plurality of problems associated with the status indicative of unsolved to a status indicative of solved, and storing the solution to the problem in the respective problem entry;
    in response to an identification of each of the plurality of problems:
        presenting an indication of problem information on a respective client terminal from the plurality of client terminals to assist in eliminating said respective problem,
        for each respective problem of the plurality of problems associated with a status indicative of unsolved: identifying which users having same or similar problem to the respective problem have not yet solved the same or similar problem, monitoring the respective problem entry associated with the respective problem having a status indicative of unsolved for a change in the status to a status indicative of solved, and in response to the change, presenting the solution to the respective problem stored in the respective entry on the client terminals of the identified users having same or similar problem to the respective problem that have not yet solved the same or similar problem;
    wherein said analyzing includes determining a degree of similarity between each of said plurality of regular expressions and a plurality of expression templates.

2. The method of claim 1, wherein said plurality of log files are received from a plurality of sources external to a plurality of integrated development environments (IDEs) used for debugging the plurality of software programs in runtime.

3. The method of claim 2, wherein said problem information includes at least one of a code section relating to each of said respective problem, time when said problem occurred, details of a user working on the problem, notes entered by a user working on the problem and a solution status of the problem.

4. The method of claim 1, wherein at least some of said plurality of log files are sent by users of said plurality of client terminals.

5. The method of claim 1, wherein said indication is presented in the graphical user interface (GUI) of said first client terminal.

6. The method of claim 5, wherein said indication includes marking said new problem in said GUI according to a solution status stored in a respective problem entry of the plurality of problem entries.

7. The method of claim 1, wherein said indication includes a list of entries, each relating to one of said at least one problem.

8. The method of claim 7, wherein said list is sorted according to at least one of a degree of similarity of a expression template of each of said at least one problem to said regular expression, a solution status of said at least one problem, and a relationship of a user to other users relating to said at least one problem.

9. The method of claim 1, further comprising:
    detecting a new solution to said respective problem; and
    sending a message to be presented in at least some of the plurality of client terminals relating to said respective problem, indicating a possible solution is found.

10. The method of claim 1, further comprising:
    receiving a command from a user to publish a request for help in eliminating a new problem; and
    sending a message to be presented in at least some of said plurality of client terminals relating to said new problem, indicating help is requested.

11. The method of claim 1, wherein at least some of the plurality of expression templates are plurality of textual expression templates provided by at least one user.

12. The method of claim 1, wherein the solution is automatically identified when the problem did not reappear after a certain number of runs of the developed one of a plurality of software programs.

13. The method of claim 1, wherein for each respective problem of the plurality of problems associated with the status indicative of unsolved, in response to monitoring the respective problem entry associated with the at least one of the plurality of problems with the status indicative of unsolved for the change in the status to the status indicative of solved, and the solution to the problem stored in the respective entry is presented on a plurality of client terminals for which corresponding code add-ons connected to the IDE indicated an encounter with a similar problem.

14. The method of claim 1, wherein the problems stored in the problem entries on the server are similar to the plurality of problems identified by the code add-on connected IDE, wherein similar is defined by two different pieces of code from two different methods, functions and/or code segments, having a same type of problem when interacting with an infrastructure, wherein an exact location in code which calls the infrastructure which eventually causes a problem is different.

15. A non-transitory computer readable medium comprising computer executable instructions adapted to perform the method of claim 1.

16. A software program product for automatically cross-referencing problem information between code developers, comprising:

a non-transitory computer readable storage medium comprising program instructions for;

using a plurality of code add-ons connected to respective integrated development environments (IDEs) executed on at least some of a plurality of client terminals that are connected with a server over a network, for:

monitoring a plurality of log files each generated in runtime by an execution of one of a plurality of software programs which is executed with one of the plurality of code add-ons connected to one of the plurality of IDEs on one of the plurality of client terminals;

analyzing the plurality of log files to identify a plurality of problems by identifying a plurality of regular expressions associated with the plurality of problems in the plurality of log files, the plurality of regular expressions are stored in a plurality of problem entries on the server, each containing problem information of at least one of said plurality of problems, wherein at least one of said plurality of problems of the plurality of problem entries stored on the server is associated with a status indicative of unsolved;

analyzing commits to a code repository of the plurality of software programs to identify a solution to at least one of said plurality of problems of the plurality of problem entries stored on the server associated with the status indicative of unsolved;

providing the solution to the server for updating the respective problem entry of the at least one of said plurality of problems associated with the status indicative of unsolved to a status indicative of solved, and storing the solution to the problem in the respective problem entry;

in response to an identification of each of the plurality of problems:

presenting an indication of problem information on a respective client terminal from the plurality of client terminals to assist in eliminating said respective problem, for each respective problem of the plurality of problems associated with a status indicative of unsolved: identifying which users having same or similar problem to the respective problem have not yet solved the same or similar problem, monitoring the respective problem entry associated with the respective problem having a status indicative of unsolved for a change in the status to a status indicative of solved, and in response to the change, presenting the solution to the respective problem stored in the respective entry on the client terminals of the identified users having same or similar problem to the respective problem that have not yet solved the same or similar problem, wherein said program instructions are executed by at least one computerized processor from said non-transitory computer readable storage medium;

wherein said analyzing includes determining a degree of similarity between each of said plurality of regular expressions and a plurality of expression templates.

* * * * *